(12) United States Patent
Prendergast et al.

(10) Patent No.: US 8,759,784 B2
(45) Date of Patent: Jun. 24, 2014

(54) APPARATUS AND METHOD FOR DETECTING HIGH-ENGERY RADIATION

(75) Inventors: David Prendergast, Isle of Wight (GB); Michael Anderson, Isle of Wight (GB); Russell Morgan, Isle of Wight (GB)

(73) Assignee: Radiation Watch Limited, East Cowes (GB)

( * ) Notice: Subject to any disclaimer, the term of this patent is extended or adjusted under 35 U.S.C. 154(b) by 1502 days.

(21) Appl. No.: 12/304,754

(22) PCT Filed: Jun. 12, 2007

(86) PCT No.: PCT/GB2007/002211
§ 371 (c)(1),
(2), (4) Date: Sep. 29, 2009

(87) PCT Pub. No.: WO2007/144624
PCT Pub. Date: Dec. 21, 2007

(65) Prior Publication Data
US 2011/0006195 A1 Jan. 13, 2011

(30) Foreign Application Priority Data

Jun. 12, 2006 (GB) .................................. 0611620.6

(51) Int. Cl.
*H01L 27/00* (2006.01)
*G01T 1/26* (2006.01)
*G01J 1/42* (2006.01)

(52) U.S. Cl.
USPC .......................... 250/370.1; 250/371; 250/395

(58) Field of Classification Search
USPC ............................................. 250/370.1, 371
See application file for complete search history.

(56) References Cited

U.S. PATENT DOCUMENTS

| 4,419,578 | A | 12/1983 | Kress | |
|---|---|---|---|---|
| 6,002,741 | A | * | 12/1999 | Eisen et al. ..................... 378/62 |
| 6,285,029 | B1 | 9/2001 | Shahar et al. | |
| 2002/0195567 | A1 | 12/2002 | Ducourant | |
| 2003/0010924 | A1 | 1/2003 | El-Hanany et al. | |

(Continued)

FOREIGN PATENT DOCUMENTS

| DE | 196 15 178 A1 | 10/1997 |
|---|---|---|
| EP | 1 548 465 A | 6/2005 |
| FR | 2 872 921 A1 | 1/2006 |
| JP | 09 257938 | 10/1997 |

OTHER PUBLICATIONS

Jakubek et al., Neutron imaging with Medipix-2 chip and a coated sensor, Nuclear Instruments & Methods in Physics Research, Section—A: Accelerators, Spectrometers, Detectors and Associated Equipment, Elsevier, Amsterdam, NL, vol. 560, No. 1, May 1, 2006, pp. 143-147, XP005364825, ISSN: 0168-9002, p. 143-144.

(Continued)

*Primary Examiner* — David Porta
*Assistant Examiner* — Carolyn Igyarto
(74) *Attorney, Agent, or Firm* — Knobbe, Martens, Olson & Bear LLP

(57) ABSTRACT

A high-energy radiation detector apparatus, comprising a high-energy radiation detector substrate and a plurality of charge collection electrodes operatively coupled to first and second opposing sides of the detector substrate is disclosed. Charge collection circuitry is associated with the plurality of charge collection electrodes for collecting charge induced on the charge collection electrodes by a high energy radiation photon interaction event caused by high-energy radiation incident on the detector substrate.

26 Claims, 10 Drawing Sheets

(56) References Cited

U.S. PATENT DOCUMENTS

| | | | |
|---|---|---|---|
| 2003/0069002 | A1 | 4/2003 | Hunter et al. |
| 2003/0111674 | A1 | 6/2003 | Fossum |
| 2004/0028182 | A1 | 2/2004 | Tamegai |
| 2004/0094720 | A1 | 5/2004 | Dagan et al. |
| 2004/0149918 | A1 | 8/2004 | Craig et al. |
| 2005/0139775 | A1* | 6/2005 | Gono et al. .............. 250/370.09 |
| 2005/0173643 | A1* | 8/2005 | Tumer ...................... 250/370.09 |
| 2006/0033034 | A1 | 2/2006 | Kaplan et al. |
| 2007/0018807 | A1* | 1/2007 | Craig et al. ................... 340/500 |
| 2008/0073544 | A1 | 3/2008 | D'Aillon et al. |

OTHER PUBLICATIONS

McGregor D S et al., Design considerations for thin film coated semiconductor thermal neutron detectors-I: basics regarding alpha particle emitting neutron reactive films, Nuclear Instruments & Methods in Physics Research, Section—A: Accelerators, Spectrometers, Detectors and Associated Equipment, Elsevier, Amsterdam, NL, vol. 500, No. 1-3, Mar. 11, 2003, pp. 272-308, XP004434690, ISSN: 0168-9002, p. 274, line 4-line 16; figure 2, abstract.

Yoshida E et al., The jPET-D4: Detector Calibration and Acquisition System of the 4-Layer DOI-PET Scanner, Nuclear Science Symposium Conference Record, 2005 IEEE Wyndham El Conquistador Resort, Puerto Rico Oct. 23-29, 2005, Piscataway, NJ, USA, IEEE, Oct. 23, 2005, pp. 2627-2631, XP010896207, ISBN: 0-7803-9221-3, p. 2627-2628.

International Search Report dated Nov. 27, 2007 for International Patent Application No. PCT/GB2007/002211 filed Jun. 12, 2007.

Barrett et al., "Charge transport in arrays of semiconductor gamma-ray detectors," Phys. Rev. Lett., 1995, vol. 75, Issue 1, pp. 156-159.

Eskin et al., "Signals induced in semiconductor gamma-ray imaging detectors," J. Appl. Phys., 1999, vol. 85, pp. 647-659.

Heikkinen et al., "Modeling a Poisson forest in variable elevations: a nonparametric Bayesian approach," Biometrics, 1999, vol. 55, Issue 3, pp. 738-745.

Knoll, Glen, Radiation Detection and Measurement, John Wiley & Sons, Inc., 1999. 3 pages.

International Search Report issued Jan. 28, 2009, International Appl. No. PCT/GB2007/002152, 4 pages.

Johnson et al., "Applied multivariate statistical analysis," 2007, New Jersey Prentice Hall, cover pages, table of contents, pp. 149-272.

Knoll, Glen, Radiation Detection and Measurement, John Wiley & Sons, Inc., 1999, cover pages, pp. 73-75.

Press et al., "Numerical recipes in C: The art of scientific computing," 1986, Cambridge University Press, p. 287.

Rumelhart et al., "Learning internal representations by error propagation," Sep. 1985, Parallel Distributed Processing: Exploration in the Microstructure of Cognition. vol. 1: Foundations, Cambridge, MA, MIT Press. 49 pages.

* cited by examiner

APPARATUS AND METHOD FOR DETECTING HIGH-ENGERY RADIATION

RELATED APPLICATIONS

This application is a continuation of PCT/GB2007/002211, filed Jun. 12, 2007, which was published in English and designated the U.S., and claims priority to GB 06111620.0, filed Jun. 12, 2006, each of which are incorporated herein by reference.

FIELD

The present invention relates to a high-energy radiation detector apparatus, device and system. In particular, but not exclusively to high-energy radiation apparatus and devices configured to identify a direction of incident high-energy radiation, and systems operative to locate the position of a source of high-energy radiation.

BACKGROUND

In general ionising radiation is considered to be radiation within the energy range 5 KeV to 6 MeV and includes gamma rays, x-rays, beta-rays, alpha-rays and neutron beams. Devices for detecting ionising radiation are well-known for radiological protection and metrology, such as in health or nuclear physics as well as national/homeland security and anti-terrorist applications. The devices are one of two types, either passive detectors or electronic-based active detectors.

Passive detection systems use film (film-badges), thermoluminescent detection (TLD) or photochromatic technologies (PC) as detector materials. Common to these detector technologies is that they register the presence of ionising radiation by a change of state. For example, a film exposed to ionising radiation goes dark when developed, TLD materials emit light when heated having previously been exposed to ionising radiation and PC materials change colour when irradiated with ionising radiation. However, the change of state of these materials requires special processing in order to be determined, for example developing the film or heating the TLD material. Consequently, only an historic monitoring and evaluation of radiation exposure can be obtained. It is not possible to achieve real-time monitoring and evaluation. Since no direct real-time monitoring or analysis is possible it is therefore necessary to infer what type of radiation exposure caused the change of state. Although such inference can be drawn based on experience, nevertheless it is not possible to precisely determine what type of radiation (spectroscopic information) has been sensed nor an estimate of radiation dose which takes into account such information. Additionally, known passive detection systems generally have poor sensitivity to ionising radiation.

Active detectors may be based upon silicon technology and generally comprise one, two or three PIN-diodes, each PIN-diode having a preset threshold level to signal an alarm relating to a minimum energy level of incident radiation.

If more than one PIN-diode is used then different threshold levels may be preset corresponding to different radiation and energy levels thereby providing crude spectroscopic analysis of incident radiation. However, silicon has poor sensitivity to ionising radiation since it does not have a high atomic number (Z), therefore there is inefficient conversion of the incident radiation to electric current and devices using such technology suffer from poor signal to noise ratio.

Another drawback of known active detectors is that the electronic signals are generated remote from the detector substrate, leading to signal losses and signal mis-shaping due to the impedance of connecting wires and circuitry.

Furthermore, the spectral resolution of known devices can be poor, particularly if a low grade detector material is used. This is because low grade detector material can affect the amount of charge generated in a photon interaction charge generation event, and also may affect the transport properties of the detector material which may reduce the amount of charge that may be collected at an electrode. This leads to inaccurate measurement of charge and hence inaccurate estimation of the energy of the incident photon which gave rise to the charge generation.

Additionally, where the charge is generated in the detector substrate determines the amount of charge that is collected at an electrode, in particular the phenomenon of "charge trapping" reduces the charge that may be collected at the electrodes and the further away from an electrode that charge is generated the greater the possibility of charge trapping. This blurs the perception of the charge generated for a given radiation event and hence reduces isotopic spectral resolution.

Various solutions have been proposed to compensate for the deleterious effects described above.

One example of a known technique for addressing at least some of the problems described above is the Frisch Grid arrangement [1] in which a band of metal is placed around the outside of the sensor material block. The metal band provides a secondary bias electrode. A voltage is applied to this secondary electrode, which changes the electric field in such a way to inhibit the passage of holes towards the cathode and hence restrict charge collection signals to those generated from electrons. Such an arrangement has been know to provide 2% spectral resolution FWHM (Full Width Half-height Maximum) at 662 KeV.

A second example is a coplanar grid arrangement of electrodes in which charge collection electrodes are separated by non-charge collecting electrodes. The charge collection electrodes collect electrons and also induce a charge on the non-collecting electrodes. By post-processing of signals the effect of induced charge on collection electrodes due to charge collected on other charge collection electrodes may be compensated for.

A third method is a ballistic compensation method. A respective anode and cathode electrode are placed on opposite sides of a block of sensor material, and the charge collected at the anode and cathode electrode compared to determine the depth of interaction of the incident radiation. This depth information is used to compensate for depth dependent charge collections effects. Thus improving the accuracy of the estimate of the energy of the photon interaction event causing the generation of the charge.

Embodiments of the present invention were devised with the foregoing in mind.

SUMMARY

Viewed from a first aspect in accordance with the invention there is provided a high-energy radiation detector apparatus, comprising a high-energy radiation detector substrate and a plurality of charge collection electrodes operatively coupled to first and second opposing sides of the detector substrate. Charge collection circuitry is associated with the plurality of charge collection electrodes for collecting charge induced on said charge collection electrodes by a high energy radiation photon interaction event caused by high-energy radiation incident on the detector substrate.

Viewed from a second aspect of the invention there is provided a method for operating high-energy radiation detector apparatus comprising:

a high-energy radiation detector substrate;

a plurality of charge collection electrodes operatively coupled to first and second opposing sides of said detector substrate; and charge collection circuitry associated with said plurality of charge collection electrodes for collecting charge induced on said charge collection electrodes by a high energy radiation photon interaction event caused by high-energy radiation incident on said detector substrate;

the method comprising comparing signals representative of charge collected from corresponding charge collection electrodes of said respective first and second sides for determining a depth of a photon interaction event in said detector substrate.

The plurality of charge collection electrodes may create a pixelated charge collection arrangement which provides better spatial resolution and precision for collected charge. Charge collected from electrodes for respective surfaces may be compared to determine co-incidence, in particular with respect to corresponding electrodes, thereby increasing confidence that a true or real photon interaction event had occurred.

Suitably, the apparatus comprises signal processing circuitry configured to compare charge values representative of charge collected from corresponding charge collection electrodes of said respective first and second sides for determining a depth value of a photon interaction event in said detector substrate.

In one embodiment, the depth of interaction is determined by establishing the ratio of the charge collected by an electrode for the first surface to the charge collected by an electrode for the second surface, and looking up that ratio in a calibration table having charge ratio values paired with depth values to determine a corresponding depth value.

Knowing the depth of interaction allows for more accurate determination of the energy level of the incident radiation, and therefore improves the spectral resolution of the apparatus.

The signal processing circuitry may be configured to modify charge values in dependence on the depth value of the photon interaction event.

By using knowledge of the depth of interaction and of the charge collected for at least one electrode, an improved accuracy for the determination of the energy of the radiation causing the photon interaction which generated the charge may be estimated.

In one embodiment signal processing circuitry is configured to determine a direction of incidence of the incident radiation relative to the detector substrate.

Determining the direction of incidence of the incident radiation relative to the detector substrate may provide a mechanism for determining the location of the source of the incident radiation.

In a particular embodiment, the signal processing circuitry is configured to determine the direction of incidence based on the number of photon interaction events in said detector substrate relative to the position of said photon interaction events in said substrate.

This provides a mechanism for statistically determining a direction of incidence of incident radiation based on charge collected at the electrodes.

In another embodiment the signal processing circuitry is configured to determine the direction of incidence based on an analysis of signals representative of charge corresponding to a photon interaction event derived from a Compton scattering photon interaction event and charge derived from said Compton scattering photon interaction event.

Detecting charge corresponding to a photon interaction event derived from Compton scattering allows for the determination of the energy of that event.

An estimate of the direction of incidence of the incident radiation relative to the detector substrate may be derived from Compton back projection analysis based on that energy. The direction of incidence may be determined relative to the position of the Compton scattering event if the position of the Compton scattering is determined from charge corresponding to the Compton scattering event.

Optionally or additionally, additional apparatus such as described above may be provided wherein signal processing circuitry of the additional apparatus is configured to determine the direction of incidence based on an analysis of signals representative of charge corresponding to a photon interaction event in a detector substrate of the additional apparatus derived from a Compton scattering photon interaction event in the detector substrate of another apparatus and charge derived from said Compton scattering photon interaction event.

The foregoing is based on a conventional arrangement for detecting Compton scattering events, and eases identification of photon interactions derived from Compton scattering events as such events likely to occur distal from (i.e. in further detector substrate) a Compton scattering event.

Suitably, the apparatus provides a direction signal representative of said direction of incidence of said incident radiation, which may provide a convenient signal useable by external circuitry.

In one embodiment the apparatus comprises a boron or lithium coating over one or more surfaces of said detector substrate. The boron coating provides a neutron detector, since neutrons incident on the boron or lithium create high-energy alpha particle radiation which enters the high-energy radiation detector material causing interaction events thereby generating charge which is collected at the charge collection electrodes. In this way, neutrons may be sensed.

In one implementation using the apparatus a high-energy radiation location device is provided which comprises apparatus which outputs a direction signal to a user interface configured to present to a user an indication of a direction of incidence of high-energy radiation relative to the device corresponding to the direction signal.

Such a device provides a convenient mechanism for a user to be provided with an indication of the source of high-energy radiation. This may be important for radiological protection such as the identification of ionising radiation hazards, and also for the identification of terrorist threats using radioactive material.

Suitably, the further comprises a display mechanism and the indication of a direction of incidence of high-energy radiation relative to said device corresponding to said direction signal comprises displaying a direction indicator on said display. This provides a convenient user interface mechanism.

The display may be a liquid crystal display, and the device configured as a portable or handheld device.

Another embodiment of the invention comprises a central station operative to receive data signals over a communications network and comprising a display; a plurality of apparatus outputting a direction signal each operative to communicate a data signal representative of the direction of incidence over a communications network to a central station;

and wherein the central station is configured with location and orientation information for each of the plurality of apparatus and further configured to estimate from location and orientation information and the data signal corresponding to respective apparatus a location of a source of the high-energy radiation.

This provides a network which can determine the location of a source of radiation rather than just the direction from which the radiation is being emitted. This may assist in the prompt handling of a radiation hazard or threat.

Suitably, at least a one of the apparatus is operative to communicate wirelessly with the central station, which allows apparatus to be moved easily and eases set-up. Additionally, the apparatus may comprise a Global Positioning System (GPS) module and is operative to provide GPS derived location information and orientation information to said central station.

Thus, the apparatus can be moved around and still communicate location and orientation to the central station. This may ease set up and may provide for an adaptive network.

Viewed from a third aspect in accordance with the invention there is provided a method of calibrating a high-energy radiation detector substrate for determining a depth of interaction of a photon interaction event in the substrate. The high-energy radiation detector apparatus comprises a high-energy radiation detector substrate and a plurality of charge collection electrodes operatively coupled to first and second opposing sides of the detector substrate. Charge collection circuitry is associated with the plurality of charge collection electrodes for collecting charge generated in the detector substrate by a high energy radiation photon interaction event caused by high-energy radiation incident on the detector substrate. The method comprises transmitting a highly collimated light beam along an axis of the detector substrate in a plane substantially parallel to the first and second surfaces; measuring the distance of the plane relative to at least a one of the first and second surfaces, and the distance of the light beam from an edge of a one of the first and second surfaces in a direction substantially parallel to said first and second surface and transverse to said light beam thereby to define a position of the light beam in a plane transverse to a plane of the first and second surfaces; measuring charge collected by charge collection circuitry from charge collection electrodes along an axis of respective first and second surfaces corresponding to said light beam; and determining a ratio of charge collected from a first charge collection electrode of the first surface to charge collected from a second charge collection electrode of the second surface wherein the first and second charge electrodes are disposed substantially confronting one another.

Light sources having highly collimated beams are readily available, and provide a convenient method of inducing photon interaction events along a narrow axis within the detector substrate.

Typically, the method comprises scanning the light beam across the transverse plane and measuring charge along the axis for each scan position, which allows for a determination of charge generation against electrode position within the detector substrate. Suitably, the plurality of charge collection electrodes form respective pixellated arrays for said first and second surfaces.

The scanning may be based on a step size corresponding to a charge collection electrode or pixel spacing.

Viewed from a fourh aspect there is provided a high-energy radiation detector substrate, comprising:

a first surface having a pixellated distribution of charge collection electrodes disposed thereon; and a second surface opposing said first surface and having a pixellated distribution of charge collection electrodes disposed thereon.

LIST OF FIGURES

DETAILED DESCRIPTION

General Outline

Figure 1:
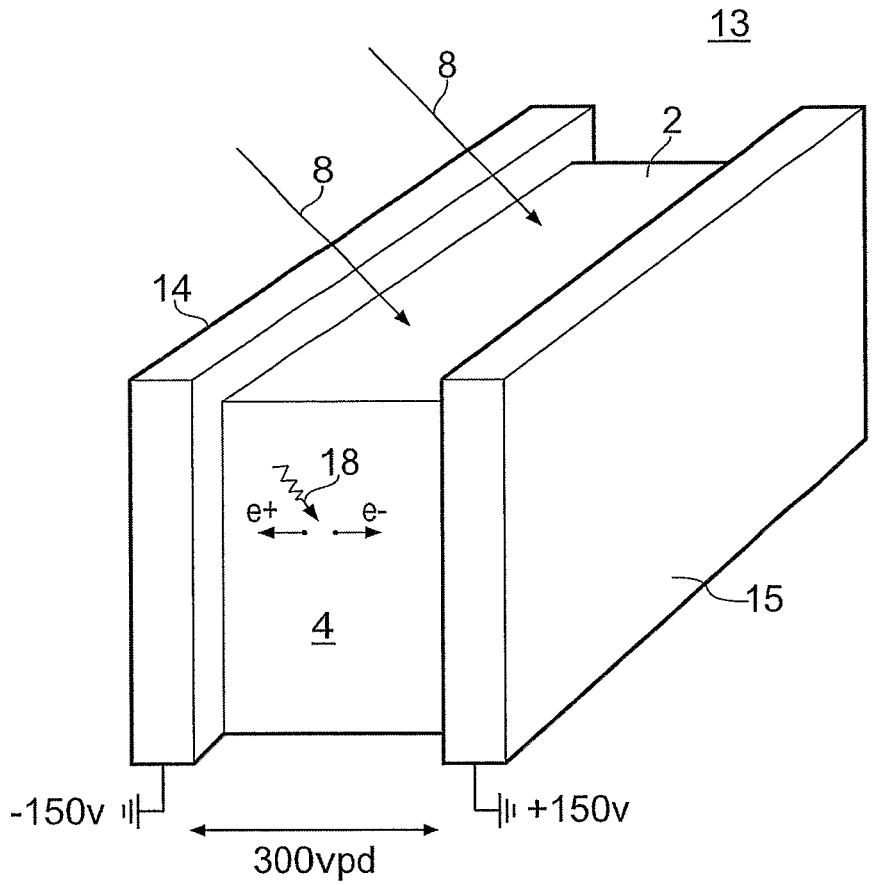
FIG. 1 is a schematic illustration of a 3-Dimensional detector device in accordance with an embodiment of the invention.

In accordance with an embodiment of the present invention a block of high energy radiation sensing semi-conductor crystal 4 forming a detector substrate 2 is sandwiched between two charge collection circuitry circuit substrates 14 and 15 as schematically illustrated in FIG. 1. One of the charge collection circuit substrates, 14, is configured to collect charge induced by holes generated in a photon interaction event and is negatively biased with respect to circuit substrate 15, whilst circuit substrate 15 is positively biased with respect to circuit substrate 14 and collects charge induced by electrons generated in a photon interaction event. The electrons and holes are generated by photon interaction events 18 in the detector substrate 2 caused by incident ionising radiation 8.

A detector substrate 2 in accordance with an embodiment of the present invention has a semi-conductor crystal 4 clad on opposite surfaces thereof with a plurality of conductive contact pads 10 which may act as charge collection electrodes. Each array of contact pads forms respective pixellated surfaces 5 and 6.

In the illustrated example the semi-conductor crystal 4 is Cadmium Telluride (CdTe) but other suitable semi-conductor materials may be used, such as CZT, Si, GaAs, CdMgTe or a halide of a metal with a high atomic number, by way of non-limiting example.

Each conductive pad 10 is electrically isolated from the other contact pads. The respective arrays of pads 10 form an array of ionising radiation sense volumes 12. In the illustrated example an array of 50×50 sense volumes 12 is created from the two arrays of conductive contact pads, each pad having dimensions 100 microns by 100 microns. The contact pads may be of any other suitable size, for example 300 microns by 300 microns. Typically the contact pads are square, but they could be any other suitable shape such as triangular, hexagonal or other polygonal shape or circular, for example. The conductive material for the conductive contact pads may be any suitable material for depositing on a semi-conductor, in particular a high Z (atomic number) semi-conductor, and may comprise aluminium (Al), gold (Au), or platinum (Pt) for example.

Detector Structure

Figure 2:
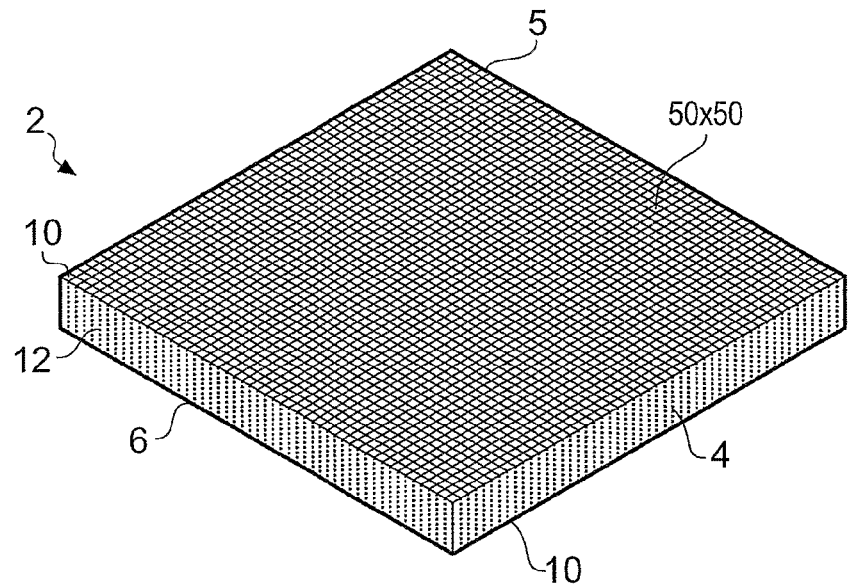
FIG. 2 is a schematic illustration of a detector substrate for a detector device in accordance with an embodiment of the invention.
Figure 3:
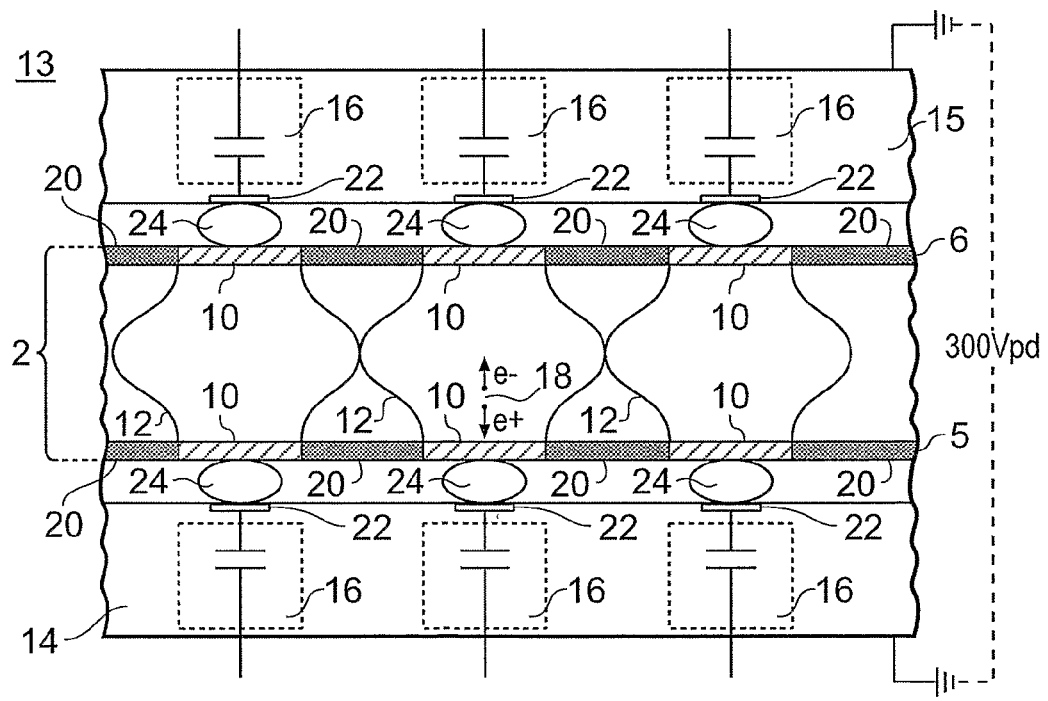
FIG. 3 is a schematic illustration of the cross-section of a detector device in accordance with an embodiment of the invention.

A cross-section of a detector device 13 as illustrated in FIG. 1 comprising a detector substrate 2, as illustrated in FIG. 2, and respective semi-conductor circuit substrate 14 and 15 is illustrated in FIG. 3. In use a bias voltage, for example 300 volts (other bias levels may be used suitable for the detector substrate material in use, for example 1000V per 10 mm), is applied between the respective arrays 5 and 6 of conductive pads 10 which form sense volumes 12. For example, circuit substrate 14 and contact pad array 5 may have a reference potential of −150V whilst circuit substrate 15 and contact pad array 6 may have a reference potential of 150V.

The applicant has coined the term "voxor" (volume detector) to refer to a sense volume comprising the three dimensional energy collection cell within the detector alone or with the circuit substrate collection circuitry and one or other meaning may apply depending on the context in which the term "voxor" is used.

Ionising radiation 8 incident on the detector 13 forms an electron-hole pair 18 in a sense volume 12 (referred to herein as a photon interaction event) and the bias voltage causes the positive and negative charges (holes e+ and electrons e−) to migrate to contact pads 10 in respective arrays 5 and 6.

In the illustrated embodiment the electrically isolating space between contact pads 10 is filled with a passivation material 20, for example aluminium nitride, to enhance the electrical separation and isolation of the contact pads 10 from each other.

Each circuit substrate 14 and 15 supports an array of read-out circuits 16, there being a corresponding number of read-out circuits 16 on each circuit substrate to the number of sense volumes 12.

Each read-out circuit 16 includes a circuit contact 22 for electrically coupling the read-out circuitry 16 to the detector substrate 2. A conductive bond 24 couples the detector substrate 2 to each of circuit substrates 14 and 15 to form a hybrid 3-dimensional detector 13.

In the illustrated embodiment, bonding of the detector substrate 2 to circuit substrate 14 and 15 is by way of bump-bonding. The bump-bonds 24 both mechanically and electrically couple the detector and circuit substrates together. To improve the mechanical coupling of the bump-bonding is often augmented by the practice of "under filling" in such detectors i.e. a low viscosity insulating epoxy resin is introduced into the space between bumps. The bump-bonds 24 are made of a low temperature solder such as a tin-bismuth mixture, which is particularly suitable for use with the CdTe detector material used in the described embodiment, since CdTe (and CdZnTe) is sensitive to heating and can be damaged if subjected to high temperatures, for example over 160° C. The chemicals suitable for growing bumps which fulfil this low temperature criterion are generally available from industrial sources.

The read-out substrate in the described embodiment supports CMOS circuitry and is configured as an ASIC. However, embodiments of the invention need not be limited to CMOS ASICs, but may use other substrate technologies including printing circuit board (PCB) technologies.

An advantage of having an array of relatively small cross-section sense volumes is that "hole trapping" is reduced. "Hole trapping" is the phrase used to describe the phenomenon of holes becoming locked in deep levels within the semi-conductor forbidden band. It is a common problem observed with semiconductors. The resultant partial charge collection results in low resolution of the high-energy, e.g. gamma energy, radiation. According to the small pixel theory (see papers by Barrett et al. [2] and Eskin et al. [3]) the signal contribution related to electrons dominates over the contribution from the holes in detectors having small detector volume cross-section such as pixellated detectors. This leads to an improvement in energy resolution with reduction of the aspect ratio of the sensing volume side to its thickness. The rationale is as follows. Due to hole trapping and field effects the induced charge relates to the electron flow from interactions relatively close to the read-out circuit input (i.e. conductive pad of the detector substrate). However, the holes flow towards the common negative contact. Consequently, their cumulative contribution is distributed over a number of sense volumes, thereby effectively excluding the hole contribution from a single sense volume signal.

The net effect is that detectors formed of an array of sense volumes ("pixellated") will generally provide better energy resolution than slab based approaches.

Charge Collection Circuitry

Figure 4:
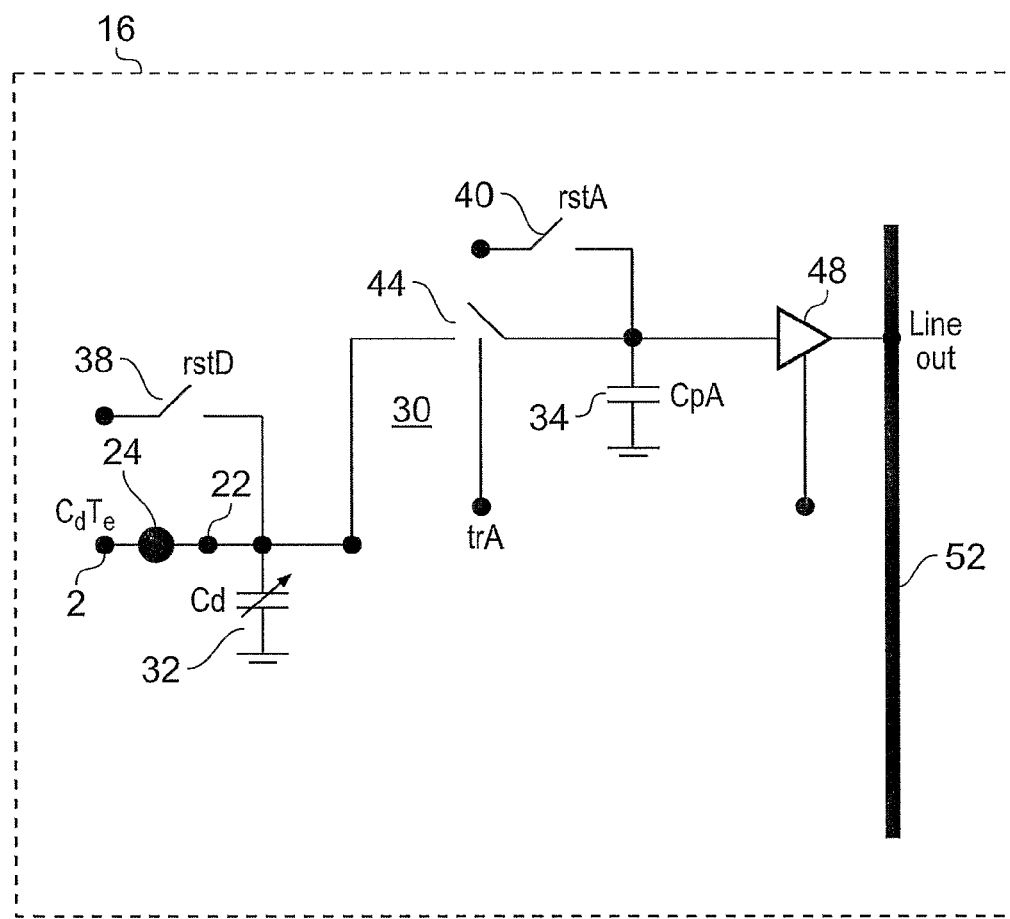
FIG. 4 is a schematic illustration of charge collection circuitry of a detector device in accordance with an embodiment of the invention.

Turning now to FIG. 4, there is illustrated a schematic circuit diagram for a read-out circuit 16 in accordance with an embodiment of the invention. In the described embodiment the read-out circuit 16 is a CMOS integrated circuit including capacitance circuitry for integrating charge pulses received from the direct dose detection radiation detector substrate 2.

Charge collection is carried out by charge integration circuitry 30 which includes two capacitances, variable capacitance Cd 32 and capacitances CpA 34. Also included in the charge integration circuitry are reset switches 38 and 40 for respectively discharging capacitances Cd and CpA.

Switch 44 may be operated to couple capacitance CpA to capacitance Cd. Each capacitance includes a capacitative circuit element which may be a discrete capacitor component or comprise parasite capacitances of other circuit elements, or a combination of both discrete and parasitic capacitances, for example. The capacitances also include resistive circuit elements which may again be discrete components, parasitics or a combination of both types of resistance.

Capacitance Cd is coupled between the circuit contact 22, which is coupled to the CdTe detector substrate 2 by a bump-bond 24, and the reference potential for the circuit substrate, 14 or 15, to which the charge integration circuitry belongs. It will be evident to the person of ordinary skill that reference potentials other than those referred to herein may be used depending upon circuit implementation.

The charge integration circuitry 30 may be operated by closing switch 44 to couple Cd and CpA together to form a capacitance suitable for capturing charge relating to a single detection event. In the described embodiment the total capacitance for a combination of Cd and CpA is 150 fF.

Variable capacitor Cd 32 may be varied to take account of charge generation of different detector substrates 2 so that a single circuit substrate 14, 15, may be used for different detector substrates 2.

Charge Read-Out

For the purposes of providing an illustrative example only, the operation of read-out circuitry 16 will now be described for a clock rate of 1 MHz and a 50×50 (2500) array of read-out circuits 16. Such operational parameters provide a theoretical maximum total charge integration time of 2.5 milliseconds per read-out circuit, although in practice some of this time will be used in circuit "housekeeping" such as resetting various capacitances. The operation of read-out circuitry 16 will also be described for ionising radiation flux densities exposure rates up to 4 Gy/hr. For the illustrative flux density range, the variable capacitance Cd is tuneable from 50 fF to 200 fF. Evidently, for other flux ranges the range of capacitance over which Cd may be varied will be correspondingly modified. The capacitance needs to be sufficient to allow for the collection of charge resulting from the photo-electric interaction of a photon interaction event. This is dependent on the energy of the incident photons, the mass transfer coefficient for the detector material at this given energy and the energy required to generate an electron hole pair for the material.

The 50 to 200 fF range for capacitance Cd includes detector substrate parasitic capacitances which for the CdTe based detector substrate 2 are about 30 to 50 fF. Switches trA, rstA and rstD are MOSFET transistor switches, but other switch means may be used, for example other forms of transistor switch. As illustrated, switches trA switches capacitance CpA into Cd, whilst switch rstA switches capacitance CpA to the reference potential for discharging the capacitances.

Output buffer 48 is coupled to the output of the charge integration circuitry 30. Buffer 48 is controllable to output a signal derived from the capacitance CpA and Cpd to an output bus "line-out" 52.

The output buffer 48 may comprise simple tri-state buffer circuitry, although optionally the buffer may also comprise additional pre-amplification circuitry. In one embodiment the output buffer 48 is configured as a two stage amplifier consisting of a first stage charge amplifier and a second stage differential amplifier attached to line-out 52, where the reference for such amplifiers are taken from a reference dummy read-out circuit, i.e. an unconnected read-out circuit. This allows the amplification to be made relative to ASIC related offset conditions e.g. temperature change.

The output from capacitance CpA is fed to respective charge amplifiers of two stage amplifiers 48 to produce a pulse suitable for input on to bus 52. This output then forms the input to the line based differential operation amplifier of the two stage amplifier 48, together with a reference input from the read-out circuit structure unconnected to the detector substrate. The output from these line amplifiers is then received by analogue to digital conversion interface circuitry.

The amplifier 48 is configured to produce pulses having magnitude or height proportional to the amount of charge collected in capacitance CpA. The amplifiers have good high frequency response in order to be able to handle the sharply-peaked pulses from the capacitances, as well as a high input impedance and linear response to the pulses.

The read-out circuitry 16 is operated to provide a charge capture window for capacitance CpA in which to capture charge generated by a single detection event in the corresponding sense volume 12. In the described embodiment the array of charge circuitry 30 of respective circuit substrates 14 and 15 corresponding to respective arrays of contact pads 5 and 6 is driven to read-out charge in a synchronised raster scan pattern such that charge circuitry 30 of opposite contact pads (that is to say contact pads on respective circuit substrates in spatial correspondence with each other) are activated substantially at the same time.

System Module

Figure 5:
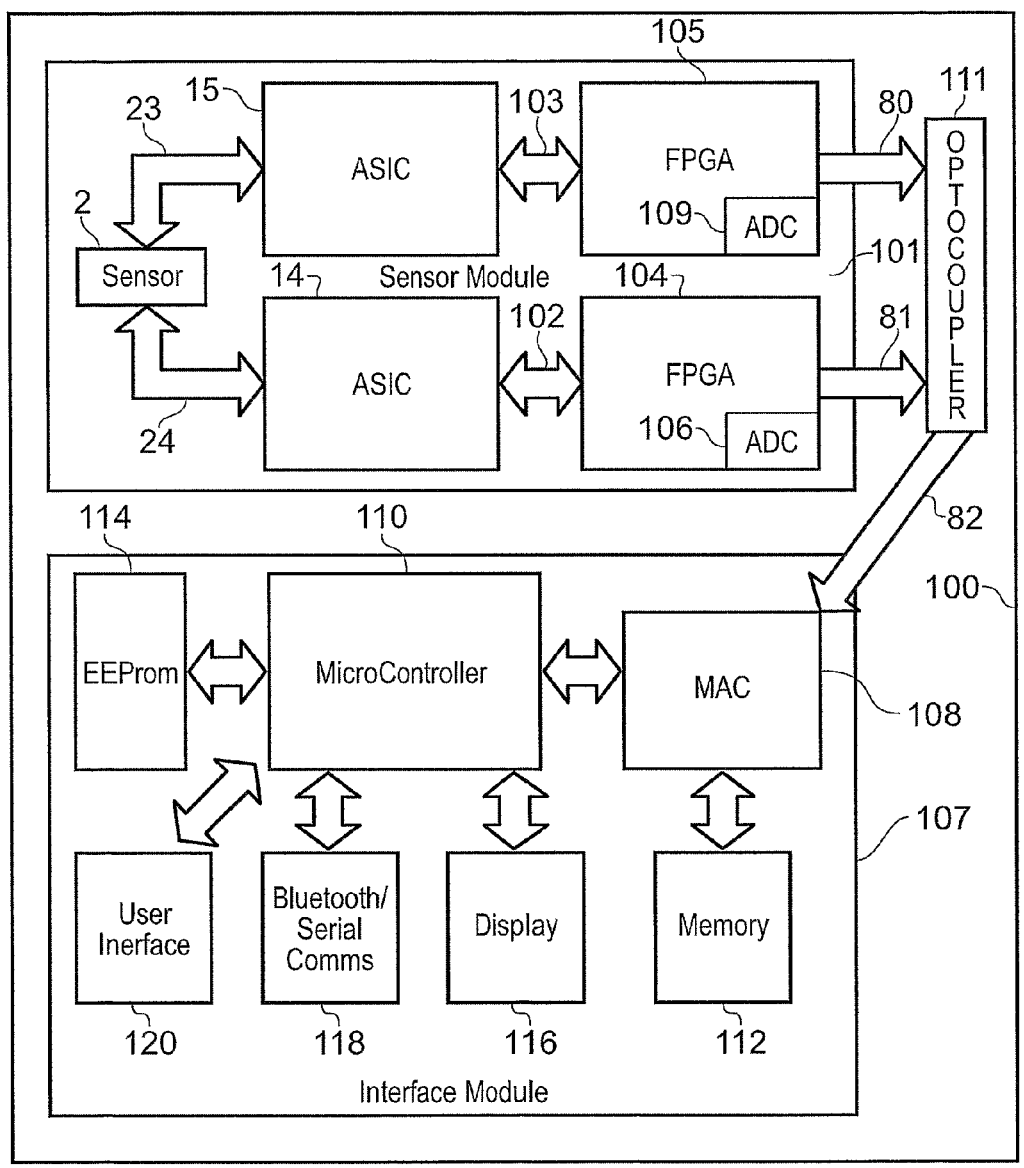
FIG. 5 is a schematic illustration of a system module for a detector device in accordance with an embodiment of the invention.

The system modules for an example of ionising radiation detection device 100 incorporating a detector and a detector device 13 are illustrated in FIG. 5. The system module responsible for converting the incoming radiation into digital signals is shown as "sensor module" 101. The sensor-module contains the radiation detector 13 (ASIC circuit substrates 14 and 15 bonded to the detector substrate 2) and a number of Field Programmable Gate Arrays (FPGAs) 104 and 105 including amongst other things the logic required to provide a control interface for the ASICs 14 and 15.

The analogue data received from respective ASIC circuits 14 and 15 is converted to digital form via the A/D converters 106 and 109 which in the illustrated embodiment are part of the FPGAs 104 and 105. Typically, FGPAs 104 and 105 in addition to containing the interface logic to control the ASIC, would normally also contain an implementation of a device calibration algorithm which ensures that the charge values are directly related to incident photon energy and cumulative exposed dose. In general terms, the FPGAs 104 and 105 produce a digital data output corresponding to "normalised" charge values detected at the pixel contact pad electrodes 10.

The digital charge values are transferred over respective serial data buses 81 and 82 into an optocoupler 111. The optocoupler 111 isolates respective ASIC/FPGA modules 102,104/103,105 at different reference potentials from each other and the rest of the system module circuitry. Signals from the optocoupler 111 are passed in serial mode over data bus 82 under the control of Memory Access Control (MAC) unit logic 108 on interface module 107. The MAC logic 108 stores the radiation data in memory 112 and interfaces with the micro-controller 110.

Micro-controller 110 controls all the elements of the ionising radiation detection device 100, for example memory management (102), display (116), communications (118) and user interface (120). Microcontroller 110 is configured by programs stored in EEPROM 114 and/or other non-volatile memory.

Under control of microcontroller control 110 the calibrated charge values received into memory 112 are used to form a cumulative normalised spectrum, incorporating information from the recent past. The spectroscopic information is used as the basis for isotopic identification. This can be either carried out by the controlling microcontroller or performed off the device using external processing power.

The data from microcontroller 110 may be transmitted to a remote location using the communications module 118. The communications module 118 may be a wire-based communications module, or a wireless-based communications module, typically for a local area network where low power radio communication is suitable, such as Bluetooth. Optionally, wire-based communication may be over much greater area, and the communications module 118 configured to comprise a higher power radio unit such as a cellular telephone transceiver or alternatively be linked to such a device via the local short distance wireless link.

The ionising radiation detection device 100 also includes a user interface 120, for providing user input controls to the device such as on/off functionality, and options for displaying various types of information.

Typically the components on the sensor-module are low power, which is particularly important for a portable detector, and it is particularly advantageous if power saving techniques are implemented in order to minimise power consumption when no radiation is present.

The arrangement of a detector device 13 such as illustrated in FIGS. 1 and 3 with a detector substrate 2 sandwiched between surfaces having charge collection electrode pixellation 5 and 6, and corresponding charge read-out circuitry 14 and 15 may be used to determine the 3-dimensional position of a photon interaction event within the detector substrate 2. In order to determine the distance of a photon interaction event from one or other of the surface pixellations 5 and 6 each device should be calibrated in order to determine the charge attenuation from a photon interaction event at a known depth in the detector substrate 2.

Depth Calibration Using Laser Beam

In one embodiment the detector device can be calibrated using a laser beam to generate photon interaction events in the detector substrate 2. Using a laser beam to generate excess carriers in semiconductors is a well known technique [4] [5] [6].

1) Lasers can induce easily detectable signals in the detector material.
2) It is possible to induce highly localised signals (laser spot sizes of 10 um are common).
3) Additionally, by choosing the appropriate wavelength it is possible to create ionization deep inside a detector substrate.

Consequently, by injecting charge at different known depth positions 141 within the detector substrate 2 it is possible to directly calibrate the ballistic compensation coefficients required on a pixel by pixel basis. For example, a charge is introduced at a known z (depth) (relative to a pixellated surface, e.g. 6) position (the x and y position are determined by the pixel coordinates) which may be cross correlated with the observed cathode and anode signals.

Figure 6A:
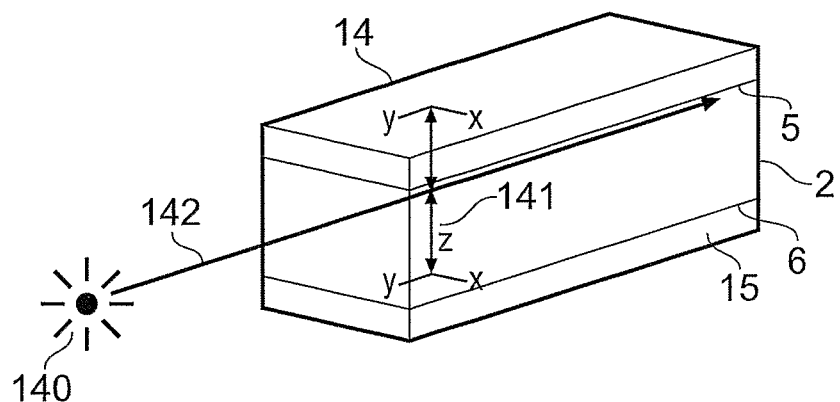
FIG. 6(*a*) is a schematic illustration of a laser calibration arrangement for a detector device in accordance with an embodiment of the invention, and (b) a schematic illustration of the cross-section of such a calibration arrangement.
Figure 6B:
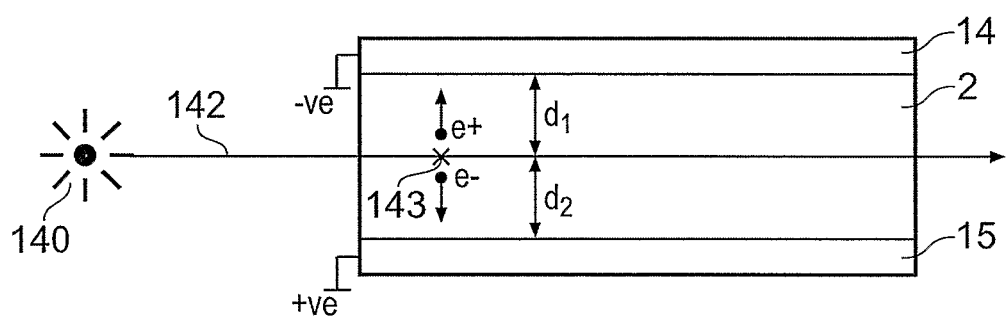

An example embodiment is illustrated in FIG. 6. FIG. 6(a) illustrates in perspective a laser source 140 (e.g. Spectra-Physics VSL-337ND-S Nitrogen Laser) illuminating a detector substrate with a laser beam 142 at a depth z, 141. Viewed in cross-section in FIG. 6(b), a photon interaction event 143 occurs and the electron-hole charge generated by the event is collection by respective charge circuitry on substrates 15 and 14. The charge circuitry on respective substrates is scanned, typically in a raster pattern synchronised with each other, and thus if more than one photon interaction event occurs along the laser beam they can be distinguished from one another by their x positions as the laser beam is incident for not only a particular z depth but also a particular y co-ordinate value (in the illustrated embodiment).

The laser beam may be scanned in a y-z raster pattern and charge readings taken for each x-y-z position from each charge circuitry substrate 14 and 15. The charge readings from each substrate 14 and 15 for each x-y-z position may be cross-correlated, for example by taking a ratio of the charge collected at respective substrates, to identify the depth of interaction.

Figure 7:
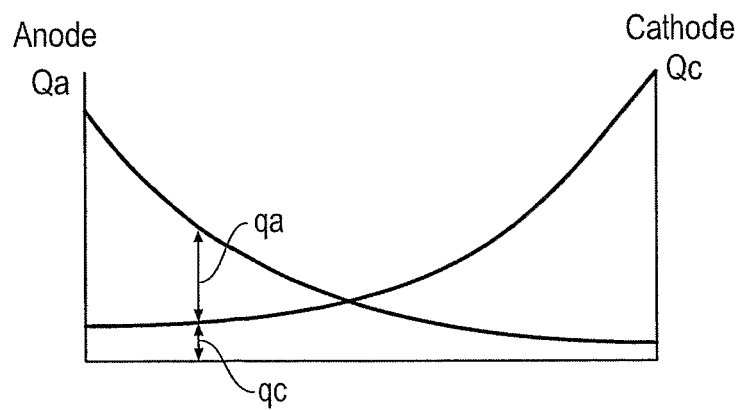
FIG. 7 is a graphical illustration of the variation of charge incident at the anode and cathode against the depth of a photon interaction event.

The correlation of charge with respect to depth z at respective anode and cathode substrates 15 and 14 is graphically illustrated in FIG. 7. For a particular photon interaction charge qA is collected at an anode pixel contact pad 10 and charge qB at a corresponding cathode pixel contact pad 10. By the term "corresponding" it is meant that the pixel pads on the anode and cathode are opposite each other to the point of confronting one another. The ratio of the charges qA:qB (or vice versa) provides a value for the depth z. Thus, the 3D position of a photon interaction event in the detector substrate 2 may be determined by way of the ratio of charges collected at the anode and cathode substrates.

In order to avoid the same charge ratio occurring for different values of z, an offset may be introduced into the charge collection process. Although the charge collection against depth z graph for the anode and cathode is inherently asymmetric due to the different transport properties of holes and electron, the asymmetry may be increased by having different sized (e.g. smaller) pixels on the anode compared to the cathode.

The above approach has the additional advantage of providing a convenient mechanism for estimating material properties.

Since the depth of interaction can be determined, the determination of the energy of a photon interaction event can be determined more accurately than without such knowledge. How this can be achieved is well documented in the field of ballistic compensation. The easiest route is to produce a number of depth dependent spectra for one or more of "calibration" isotopes (e.g. $^{241}$Am, $^{137}$Cs, $^{60}$Co), the gain factors can be calculated to align the spectral peaks in these "depth spectra". This process is described in [9].

The charge ratio values may be stored in FPGAs 104 and 105 for each pixel contact pad electrode 10 in order that charge detected at a particular pixel contact pad electrode 10 may be compensated for in terms of their depth and an accurate charge value derived. Thus, the FPGAs may output a digital value representative of the charge value compensated for depth of interaction and therefore representing an accurate energy value. A time tag derived from a system clock for the detector device is also assigned to each energy value.

The time tagged charge values from respective FPGAs are forwarded via optocoupler 111 to MAC 108 and stored in memory 112. Memory 112 may store the charge values as a series of frames for each ASIC 14 and 15, each pixel of each frame being memory mapped to a particular storage location. Frames may only be stored for a sufficient time period for post-processing to be carried such as described later, or may be archived off the system module.

Radiation Direction Determination by Photon Attenuation Profile

The applicant has appreciated that once it becomes possible to determine the 3-dimensional position of a photon interaction event within the detector substrate then it is also possible to determine direction of the incident radiation by analysing many photon interaction events. This is a practicable possibility in real-time since many photon interaction events will occur each second, for example typical hundreds per second although it may be greater of smaller than this depending on the flux intensity.

In the described embodiment the technique developed by the applicant uses the distribution of incident photon position and energies to derive the direction of the incident radiation.

The detector substrate 2 attenuates incoming photons such that fewer photons penetrate further into the substrate 2, and thus there are less photon interaction events deeper into the detector substrate 2.

Typically this is described in terms of a linear attenuation coefficient.

$$I = I_0 e^{-\mu_{CZT}(E_n)x} \quad (1)$$

Where:

I is the intensity of photons transmitted at some path length x into a material.

$I_0$ is the initial (unattenuated) intensity of photons.

$\mu_{CZT}(E_n)$ is the linear attenuation coefficient of the detector material (e.g. Cadmium Zinc Telluride—CZT) for the specific energy $E_n$ of an nth event.

The linear attenuation coefficient may be viewed as defining the probability of interaction along a particular photon direction;—

$$I_0 - I = I_0 e^{-\mu_{CZT}(E_n)x} = I_0(1 - e^{-\mu_{CZT}(E_n)x}) \quad (2)$$

Normalising, this gives the probability distribution as, $$1 - e^{-\mu_{CZT}(E_n)x} \quad (3)$$

Which gives a probability density function of, $$p(x) = \mu_{CZT}(E_n) \cdot e^{-\mu_{CZT}(E_n)x} \quad (4)$$

Figure 8:
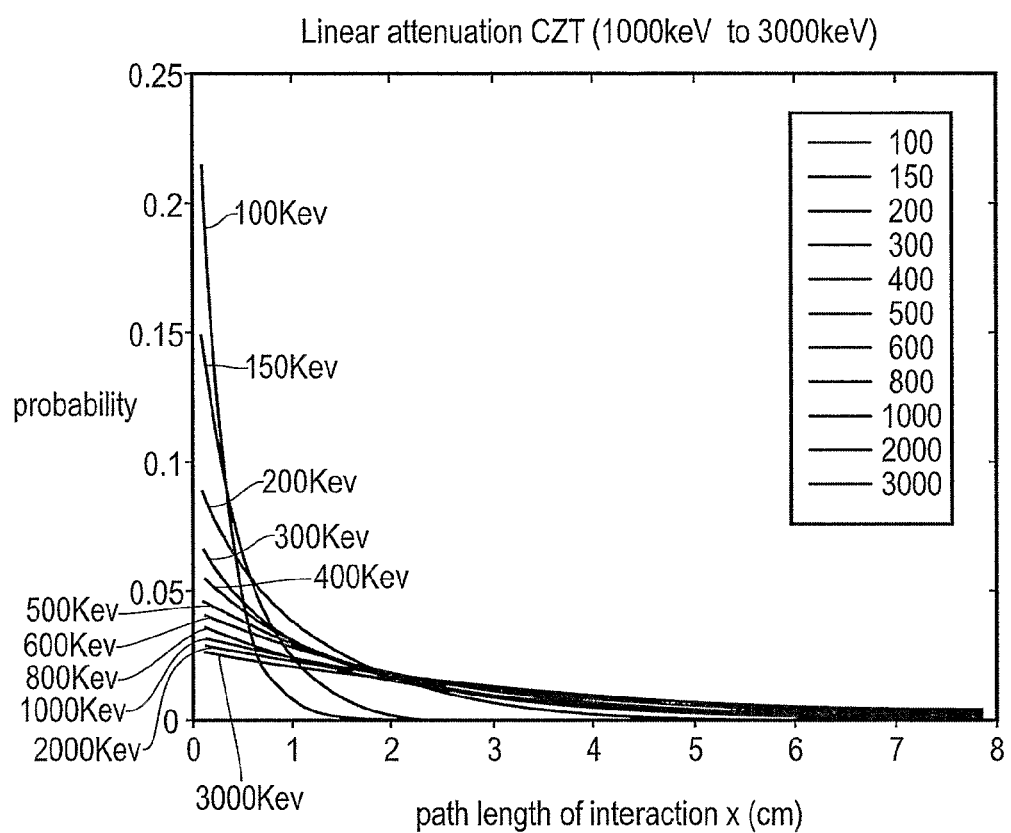
FIG. 8 is a probability density function graph for the path length interaction of high energy radiation in Cadmium Zinc Telluride.

Along a particular track within the detector there is a corresponding probability of photon interaction. Consequently, for each registered photon hit of a specific energy there are a number of probabilities corresponding to each of the potential directions the photon may have entered the detector from. As shown in the above equation the probability of occurrence, p(x), is determined by the integral of the path through the detector x. The probability of a photon interaction event in CZT against path length is graphically represented in FIG. 8 for energy ranges from 100 KeV to 3000 KeV.

When multiple interactions have occurred it is possible to formulate an optimisation which finds the most probable direction of incoming flux with a practical level of certainty.

This may be explained by an example of a single interaction, of a particular energy. In this case there will be a maximum probable direction derivable from the attenuation relationship. For one single interaction this carries very little information. This will merely correspond to the minimum path length in the detector, min x as defined in equation (5) below:

$$p(\min x) = \mu_{CZT}(E_n) \cdot e^{-\mu_{CZT}(E_n) \min x} \quad (5)$$

A second interaction provides an additional constraint, and the maximal probable incoming flux direction will be that which maximises the respective probability relationships of the first and second interactions. Each additional interaction provides additional information in relation to the potential direction of the incoming radiation. This may be generalised as the required optimisation problem in terms of n interactions as follows, $$p(\theta_d) = \sum_{i=1}^{n} \mu_{CZT}(E_i) \cdot e^{-\mu_{CZT}(E_i)x_i | \theta_d} \quad (6)$$

where $p(\theta_d)$ indicates the probability associated with the, $d^{th}$, spherical coordinate direction $\theta_d$, where $\theta$ represents the spherical coordinates $\alpha, \beta, \gamma$, $\mu_{CZT}(E_i)$, is the linear attenuation coefficient associated with the energy of the ith photon, $E_i$, n is the number of photon interaction events, and $x_i | \theta_d$, is the interaction path length, x, of the ith photon for a given spherical direction $\theta_d$.

By stepping through "all" potential incident directions, $\theta_d$, the maximum value of equation (6) may be found. This will give the direction $\theta_d$ of the incident radiation.

An illustration of a brute force approach will now be described by way of non-limiting example. Consider 100 photon interactions each with a distinct energy.

Further consider the direction searchspace consisting of 600 "sectors", i.e the set of unit direction vectors is defined by 600 equally spaced points on the surface of a sphere centred on the mid point of the detector. The brute force approach would consider direction in turn (600 direction). Each 3d interaction, (100 interactions), coordinate defines a potential interaction path. The term interaction path refers to the vector joining the interaction position and the edge of the detector along the particular direction being considered. A particular energy of photon will have an associated probability of interaction associated with this length of path.

So for each direction (600 directions);

calculate the 100 relevant path lengths (the distance to the edge of the detector for the current, $d^{th}$, direction, $\theta_d$), denote each of these $x_i | \theta_d$ i.e. path length, x, associated with the, $i^{th}$, photon and the $d^{th}$, direction vector $\theta_d$;

For each of the paths use the associated photon energies to calculate the associated probabilities of interaction i.e.

$$p(x_i, E_i | \theta_d) = \mu_{CZT}(E_i) \cdot e^{-\mu_{CZT}(E_i)x_i | \theta}$$

Sum these values together for each of 100, i, photons to calculate.

$$p(\theta_d) = \sum_{i=1}^{n} \mu_{CZT}(E_i) \cdot e^{-\mu_{CZT}(E_i)x_i | \theta_d}$$

Once this process is completed there will be 600 values of $p(\theta_d)$ i.e. one for each direction $\theta_d$. The likely direction is assigned to the direction associated with the largest value of $p(\theta_d)$.

The ordinarily skilled person will be aware of a number of optimisation methods that can be used to implement the above optimisation. For example;—

1. There are numerous ways to sample the spherical coordinate system (see icosahedral dissection references [7] [8]).
2. The direction optimisation can be based point centric of device centric coordinate schemes.
3. Various coarse to fine search schemes may be used to provide successive refinement as additional information becomes available.

However, such refinements are primarily concerned with computation efficiency and the ordinarily skilled person would choice the method suitable for their application and needs, whilst bearing in mind that the central approach is to minimise the equation shown in equation (5).

In one embodiment, the value θ is assumed to be of a spherical co-ordinate system centred on a predefined datum point within the detector substrate 2, for example at the centre of detector substrate 2. This is a valid assumption and avoids the need to compensate for the fact that the photon interaction events occur at different places in the detector substrate 2. Additionally, it is assumed that the incident radiation is a plane wave, i.e. that the rays are parallel. Again, this is a valid assumption since the source of radiation is likely to sufficiently far away for the rays to be at least near parallel.

In a further embodiment, the search for incident angles is restricted to energy values above a threshold to discriminate radiation scatter events, for example from metallic objects in the environment of the detector device, which would give misleading information as to the direction of the source of the radiation. An example of threshold value is 100 KeV, although other values may be used.

In the described embodiment, memory 112 includes instructions for microcontroller 110 for implementing the calculation described above for estimating the direction of incident radiation. The digital charge values corrected for depth of the photon interaction are retrieved by the microcontroller 110 through MAC 108 from memory 112 and utilised to derive incident radiation direction θ.

In the described embodiment direction θ is determined with reference to a coordinate system based on the dimensions and structure of the detector substrate, and a central datum point as described above. Thus, θ is relative to the detector substrate orientation.

The result of the signal processing performed by the FPGAs and the microcontroller is a direction θ indicative of the source of incident radiation. A signal representative of the direction θ may be output from microcontroller 110 to user interface 120, and displayed on a display screen to indicate a direction of the source of the radiation relative to detector device. Optionally or additionally the detector device 13 may be a part of a network of such devices and the signal representative of the direction 6 may be transmitted to another detector device (peer to peer communication) or to a central station over a wired or wireless link such as a Bluetooth link via communications interface 118. The IEEE 802.15.4a protocol may be used for peer to peer communications or for communications with a central station.

If the detector device 13 is portable and being moved then together with the transmission of θ there must be communicated an indication of the location of the detector device and its orientation. Such information is easily derivable by the inclusion of a Global Positioning System (GPS) module in the detector device together with an inertial sensor to determine orientation.

Optionally, if the detector device is part of a network of static devices then the respective locations and orientations of each device may be programmed into the central station or each device and there would be no need for the device to have a GPS or orientation sensing module.

Radiation Direction Determination by Compton Camera

In another embodiment, the direction of incident radiation is estimated using Compton scattering back projection techniques.

Compton scattering refers to an ionizing radiation photon interaction in which the resultant electron carries only part on the energy of the incoming photon. The residual energy is contained in a secondary photon.

The resultant electron and secondary photon are scattered in accordance with the Compton formula $$\lambda_f - \lambda_i = \Delta\lambda = \frac{h}{m_e c}(1 - \cos\theta_C) \quad (6)$$

Where $m_e$ is the mass of the electron, h is the Planck constant, $\theta_c$ is the Compton angle of the scattered photon to the angle of incidence of the incident radiation, $\lambda_f$ is the wavelength of the scattered photon, $\lambda_i$ is the wavelength of the incident photon, and c the speed of light.

Figure 9:
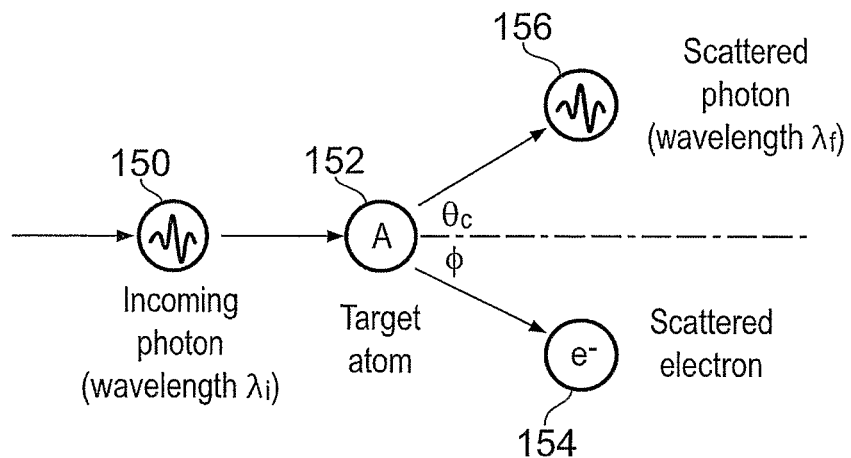
FIG. 9 is a schematic illustration of Compton scattering.

This is illustrated in FIG. 9, which schematically shows an incident photon 150 impinging on an atom 152 within the detector substrate 2. A scattered electron 154 is ejected from atom 152 by a photon interaction at an angle φ to the angle of incidence of the incident radiation, and a scattered photon 156 is generated which propagates at an angle $\theta_c$ to the angle of incidence of the incident radiation.

The Compton relationship shows that the angle of scatter, $\theta_c$, is related to the change in energy between the incident photon and the scattered photon. Consequently, if the relative positions and energies of the photons are known, then it is possible to back-project to obtain a cone of potential incident directions. Using the information from multiple events the actual direction may be resolved from the intersection of the multiple possible direction cones. This is a well-known technique and is used in so-called Compton cameras to determine the direction of incident radiation.

An embodiment of the present invention may provide both photon interaction event position information within the detector substrate 2, and an estimate of the energy of the photon interaction. The Applicant has recognised that they may configure a Compton camera either in single detector substrate illustrated in FIG. 10 or in multiple detector substrates illustrated in FIG. 11.

Figure 10:
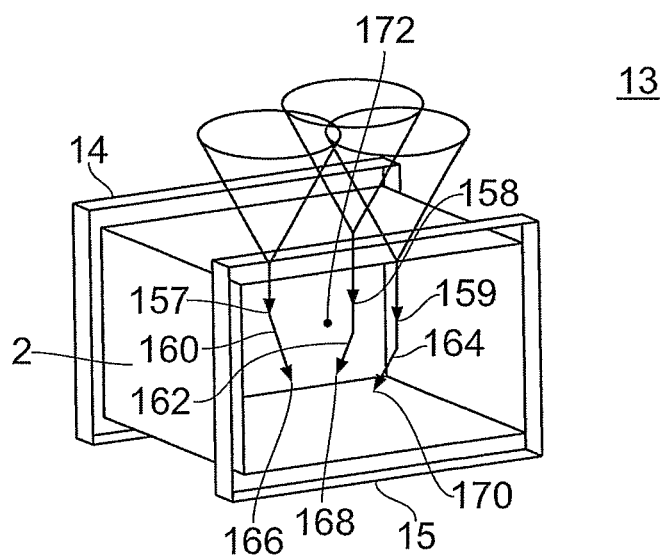
FIG. 10 is a schematic illustration of Compton camera determination of the angle of incidence for incident radiation in a single detector substrate in accordance with an embodiment of the invention.

FIG. 10 schematically illustrates a Compton camera arrangement for a single device 13. Compton scattering photon interactions 157, 158 and 159 result in respective scattered photons 160, 162 and 164 within detector substrate 2, themselves causing respective photon interaction events 166, 168 and 170. The charge generated by all the photon interaction events is collected by charge collection circuitry on respective ASICs 14 and 15.

The x-y-z position and energy of each photon interaction event is estimated as described above, and the charge values together with the time tag are stored in memory 112.

Memory 112 also stores instructions for microcontroller 110 to cause microcontroller 110 to perform a Compton scattering back-projection analysis on stored energy values to determine the direction of incident radiation.

In the first instance, microcontroller 110 is configured to identify "Compton interaction pairs" in a frame undergoing analysis. A Compton interaction pair is a pair of photon interaction events in which a first event is a Compton scattering event and the other event is one caused by a scattered photon from the first event. For example interaction events 157-166, 158-168 and 159-170 illustrated in FIG. 10 are Compton interaction pairs. Compton pairs are identified by determining pairs of events which occur sufficiently closely together in time that they are likely to be Compton pairs.

This can be achieved by reducing the exposure window duration for each frame such that less than one photon interaction event per frame is statistically likely. If two hits from a single device or two hits on adjacent devices are detected then it is statistically likely they will be Compton pairs. Reducing an exposure window duration such that less than one photon interaction event is likely to occur may be achieved by monitoring the number of hits per frame and reducing the timing on the read-out circuitry for collecting charge induced on the pixel contact pads until less than one photon interaction per frame is detected. Additionally or optionally, the relative energies of the two events may be used to estimate the probability of them being a Compton pair. For example, two photon interaction events having an energy difference of may be considered Compton pairs. Further optionally or additionally, a threshold time between events may be established and any two events falling within that threshold.

Once a Compton pair has been identified, their respective energy levels are converted to wavelengths using the relationship Energy=hc/λ, and equation (6) utilised to find the Compton angle $\theta_c$. The microcontroller 110 is configured to generate data representative of and corresponding to a cone having a cone angle corresponding to the Compton angle being projected from the photon interaction position. A minimum of three Compton scatter events is required in order to generate data representative of three cones and from whose intersection the angle of incidence of the incident radiation may be determined.

The direction determined by the intersection of the cones is referenced to a nominal datum point 172, which in the described embodiment is at the centre of detector substrate 2.

Optionally or additionally, multiple detector devices may be used. In an embodiment illustrated in FIG. 11, three detector devices 13 are utilised. The principle of operation is the same as for a single detector described above, but Compton interaction pairs may be identified where a first event is in one detector and the second event in another detector.

Figure 11:
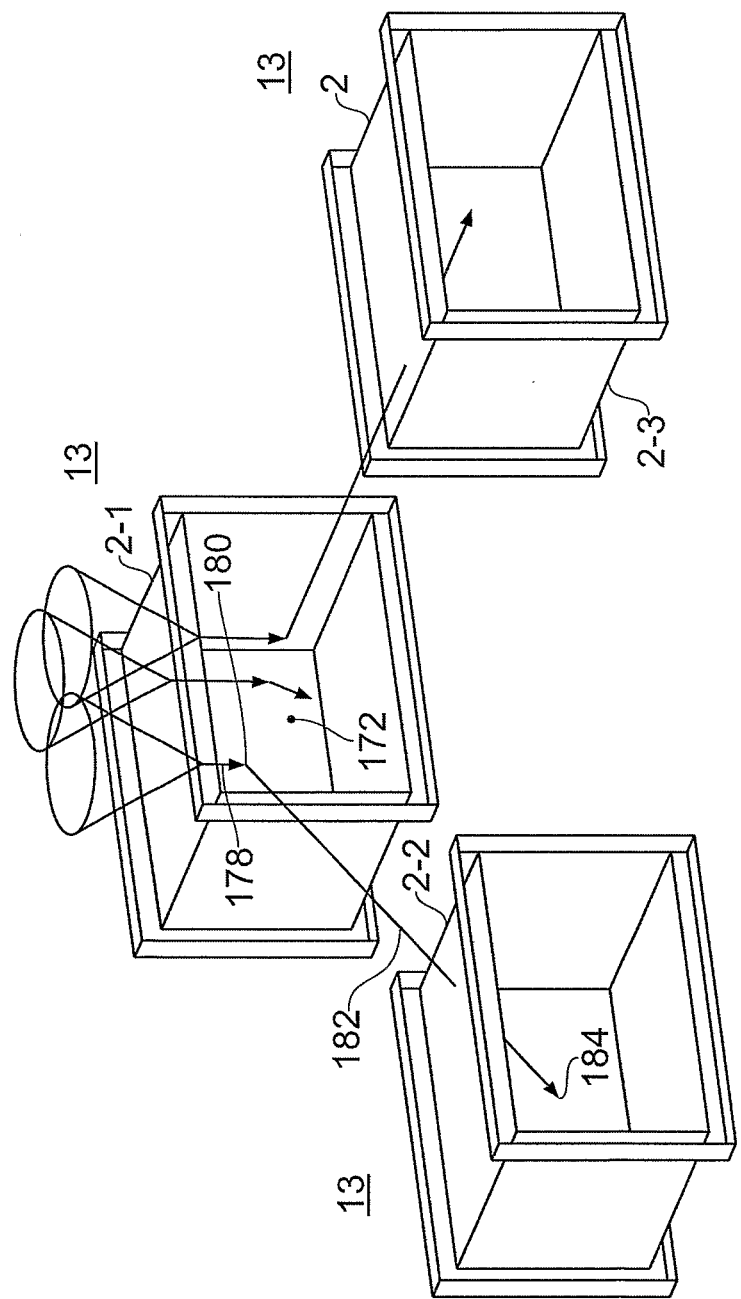
FIG. 11 is a schematic illustration of Compton camera determination of the angle of incidence for incident radiation for multiple detector substrates in accordance with an embodiment of the invention.

An example illustrated in FIG. 11 shows a Compton scattering event 180 occurring in a first detector substrate 2-1 caused by incident radiation 178. The scattered photon 182 enters a second detector substrate 2-2, and causes an interaction event 184.

In the described embodiment a single system module 100 is provided for all three detectors, and so MAC 108 receives energy values from FPGAs for all three detectors and stores them in frames accordingly. The microcontroller 110 can determine the Compton angle $\theta_c$ for the scattered photon 182 and use this, for example by reference to the nominal datum point 172 in the first detector substrate 2-1 to determine the angle of incidence of the incident radiation.

An advantage of the foregoing method is that the relative positions of the detectors need not be known.

All that is evaluated is the energy of the interaction events, and this is sufficient to determine the angle of incidence of the incident radiation causing the Compton scattering event.

Neutron Detection

In one embodiment of the present invention the detector substrate is configured to detect neutron radiation.

The detection of neutrons is complicated by their lack of charge. In order to detect them, neutrons are "converted" to charged particles via nuclear reactions. A number of different interactions possibilities are available.

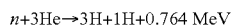

$$n+3He \rightarrow 3H+1H+0.764 \text{ MeV}$$

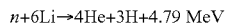

$$n+6Li \rightarrow 4He+3H+4.79 \text{ MeV}$$

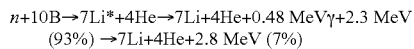

$$n+10B \rightarrow 7Li^*+4He \rightarrow 7Li+4He+0.48 \text{ MeV}\gamma+2.3 \text{ MeV}$$
$$(93\%) \rightarrow 7Li+4He+2.8 \text{ MeV } (7\%)$$

The most common shown above involve the "conversion" of an incident neutron into secondary tritons, alpha particles or recoil protons. These secondary particles may then be detected by conventional detector technology such as the detector substrate and device described herein.

In one embodiment Boron or Lithium loaded films can be placed in contact with, deposited on or be disposed very close to the detector substrate in order to detect the secondary particles (alphas or tritons) resulting from neutron interaction. Additionally, the energy of and position of such interactions can be used to distinguish them from conventional gamma interactions. This is because the photon interaction will be close to where the Boron or Lithium film has been placed as alpha and triton particles are relatively large and do not travel far into the detector substrate.

Device and System Embodiments

Figure 12:
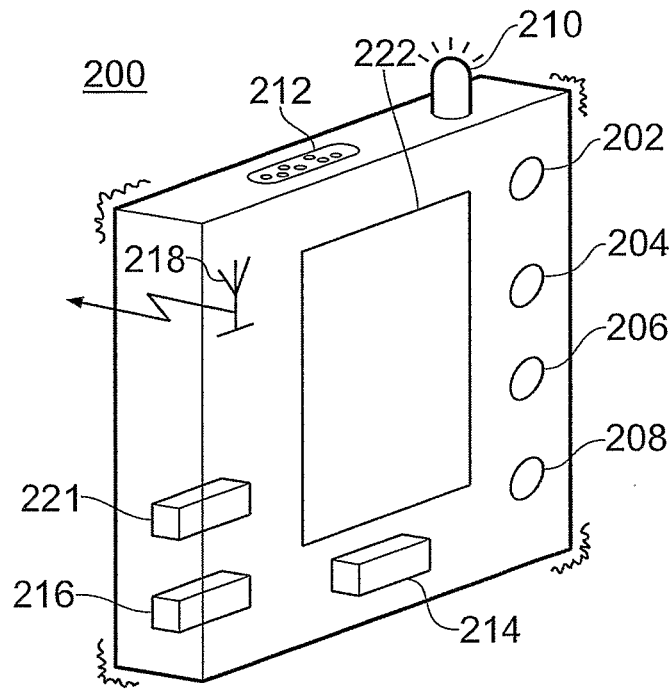
FIG. 12 is a schematic illustration of a Personal Radiation Locator Unit.

One embodiment of the invention comprises a Personal Radiation Locator (PRL) unit 200, an example of which is schematically illustrated in FIG. 12. The PRL 200 comprises an On/Off button 202, a reset button 204, a reject button 206 and a screen/menu scroll button 108. The PRL 200 also has three alert modes:

Visible: Bright LED indicator 210;
Audible: Loud audio sounder, >90 db at 30 cm 212; and
Tactile: Vibration alert 214;

which are activated when the PRL unit 200 senses a radiation threat.

Orientation of the PRL is sensed by piezo-electric type orientation sensor 216, although other types of orientation sensor are envisaged such a gyroscopic or inertial sensors. A sensor which supports dead-reckoning position estimation may be utilised in order to have this position method available for use in a directed search process.

The User controls are configured as simple pushbuttons 202-208, and sized and located so that they can be operated when wearing HazMat Level A suit gloves. The number of buttons is kept to a minimum, and the risk of incorrect operation reduced by having the buttons be "soft" i.e. the function of the button vary depending on the operational mode/screen that the user is in. This will give functionality relevant to the current task only thereby preventing inadvertent changes to other settings. Additionally relatively few changes will ever be accessible by the User; most parameter setting of the device will be achieved via a "profile" loaded to the device at time of issue, or loaded via an issuing control location.

The PRL 200 also includes a display 222 which for example is a monochrome LCD graphic display having an x,y addressable array of pixels. This provides good power saving (LCD) with maximum versatility (x,y array). The display has several screen modes, depending on what mode the user is in at the time; however threat relative location information will be visible at all times, and alarm indications will override all screens/menus (i.e. an alarm condition will immediately force the display to the alarm display mode).

PRL 200 also includes one or more detector devices 13 such as described above. Memory 112 may comprise instructions for configuring the microcontroller 110 to control the functions of the PRL 200, for example the pushbuttons 202-208 and the display 222. A particularly important function is the displaying of information relating to a radiation threat. Examples of the display screens and information that may be displayed are:

Alarm display showing type of alarm and level of event
Active measurement screen
    Radiation reading and units of display
    Total dose, dose rate
    Relative bearing to the source
    Relative bearing to neighboring IPRLs (with signal quality indicator)
    Relative bearing to base station (with signal quality indicator)
    Neutron/gamma type indicator
Directed search screen
    Motion guidance arrow
    Relative bearing of source, IPRLs, base
    Current total dose or dose rate reading
    User prompt text and user "reject" button
Spectroscopic screen showing a graphical representation of the energy peaks being measured
Isotopic screen showing the isotope name(s) and associated confidence level of the assessment. Also shows a category indicator (NORM, SNM etc. per ANSI classifications)
Location screen showing details of the geographical position and orientation of the IPRL
Battery level indicator Calibration status indicator Device parameters screens showing internal settings and configuration parameters of the IPRL Message screen for display of base station broadcast messages (to a single IPRL or all IPRLs)

A screen will typically contain text which indicates which screen the user is currently viewing. Further screens and functions may be defined by a user to support a implemented feature set as desired.

In one embodiment, microcontroller 110 is configured such that it will not be possible to configure the device without at least one alert type enabled. Although a user will be able to silence an alarm, when there is a dose or dose rate alarm, if the level that caused the alarm to sound is still present, the alarm will sound again immediately.

Figure 13:
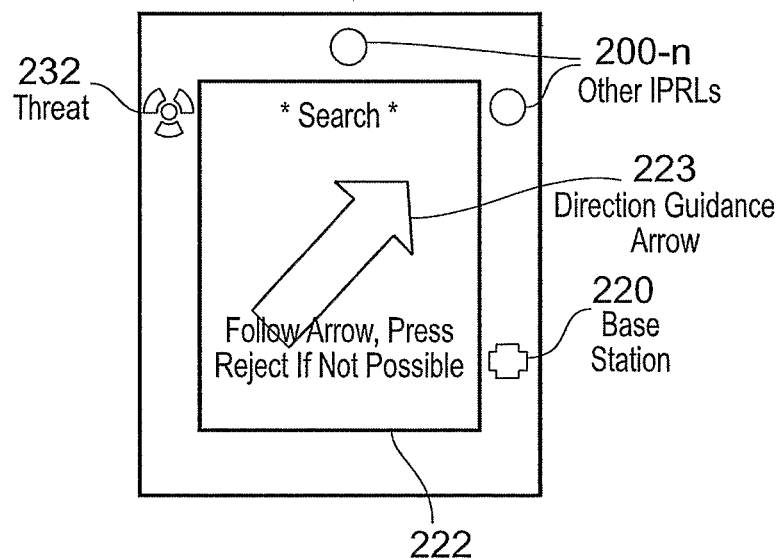
FIG. 13 is a schematic illustration of a Personal Radiation Locator Unit display showing relative location of threat, other PRLs and central station.

In a further embodiment, the microcontroller is configured to operate the PRL 200 in a directed search mode, whereby the user receives guidance for movement via an arrow 223 on the IPRL display 222. An example of such a display is illustrated in FIG. 13. The suggested movement will guide the user and PRL to locations which will provide improved information about the source of the radiation threat and its location.

This functionality integrates information from many orthogonal viewpoints, and operates under the same basic principles whether in a single IPRL environment, multiple IPRLs working in concert, or single or multiple IPRLs working in conjunction with one or more base stations.

The IPRL display may indicate the user's bearing relative to the threat 232, neighboring IPRL devices 200-n and/or master/central station(s) 220. As the user moves, these indications update to maintain correct bearing information regardless of IPRL orientation.

The user receives motion guidance via a "move this way" arrow 223 on the IPRL display. The expectation is that the user will normally orient the device to follow the arrow straight ahead, but the arrow is indicated relative to the IPRL orientation and so the user can hold the IPRL in any orientation and still get a directional arrow which points the correct way. In one embodiment the motion guidance to the user may request movement in a direction where motion is not possible (i.e. walls etc.) or not desirable (i.e. Fire, liquid spills etc.), and so the user can press a button to indicate that following the directions is not possible. The user may then receive alternative motion guidance.

In one embodiment the PRL 200 may be portable and built with an ultra-rugged instrument housing, for example manufactured of double-shot injection-moulded rubber and high-density plastic for shock protection, non-slip grip, water and dust ingress protection, and electromagnetic immunity, features important in the unknown environments encountered by first responders to suspected radiation threat incidents. Further, the unit is waterproof so that it is capable of being immersed in water for rapid decontamination. The ruggedness of the PRL unit 200 will allow the first responder to focus on the task at hand rather than having to worry about protecting the PRL unit itself.

The PRL 200 may be configured for wireless communication 218 in a peer-to-peer mode, and/or optionally a client-to-master communication. For example, wireless communications may operate in accordance with the specifications set forth in the IEEE 802.15.4a protocol. Additionally, in one embodiment the PRL may incorporate a GPS module 221 for outdoor and single device location determination.

A wireless mesh wireless network enables data rate scalability, robust communications integrity, greater than 30 meter communications range, low power consumption, and high precision location pinpointing. Such a network may also be combined with a LAN network to extend the communication range to greater than two miles and enable integration into the worldwide web, greatly extending the reach of the mesh network.

Figure 14:
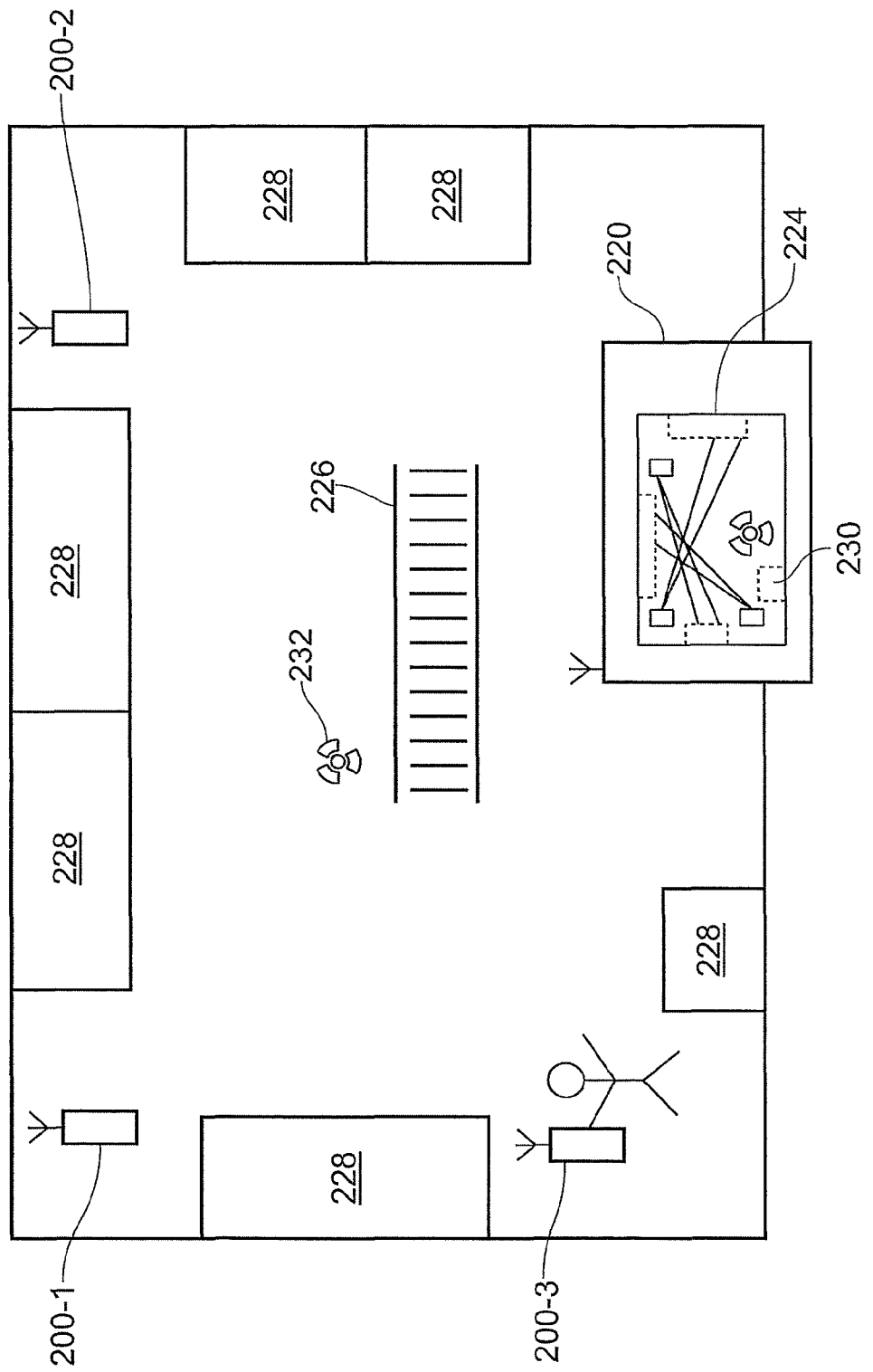
FIG. 14 is a schematic illustration of a radiation location system and network.

An example of a wireless mesh network in accordance with an embodiment of the invention is illustrated in FIG. 14. The mesh network illustrated in FIG. 14 comprises three PRL units 200-1:3 in wireless communication with a master central station 220 which receives communications from the PRL units 200 regarding the direction each one senses for the source of a radiation threat. PRLs 200-1 and 200-2 are fixed stations, whilst unit 200-3 is a portable unit. The individual units 200-1:3 may also communicate with each other "peer-to-peer". The mesh network is illustrated in a shopping mall environment having steps 226, various retail outlets 228 and a radiation threat 232.

Illustrated as part of central station 220 is a schematic display 224 for the network showing an intersection of the direction of a radiation source sensed by the PRLs 200 and communicated to the central station 220. A schematic 230 of the environment of the mesh network may be displayed also. Optionally or additionally, position information of the PRLs either pre-programmed or communicated to the central station 220 may be used to estimate a location of the radiation threat. This location can be communicated to responders to the threat.

Additionally, the wireless mesh network used for communications between devices and base stations are capable of indoor radio location, where GPS operation is limited at best. The IEEE 802.15.4a radio module achieves radio location through built-in triangulation and packet tagging schemes with accuracies down to one meter when used with a based station at a known fixed location.

Implementation of embodiments of the invention may be achieved using software, firmware, hardware or a combination of any two or more of software, firmware and hardware. For example, signal processing and pattern recognition firmware may be used to implement algorithms with careful attention to the required processing power (with respect to battery life). Firmware may be based upon data from several modelling and engineering prototype exercises, which include use of the existing detector technology developed by the Applicant, for example that disclosed in International Patent Application Publication Number WO 2005/008286, which is already well characterized.

Directed search software may be developed on a base station computer system such as a personal computer (PC) and then ported to the hand-held environment. The search algorithm may be tuned to match the characteristic of each or a new detector array for peak performance.

Mapping aspects of the base station may be integrated into existing legacy computer interface and mapping software. The system has the ability to display events in real-time on user supplied GIS maps.

Optionally, the calculation workload may be spread across several PRLs that are in communication with each, and also the base station may be used to perform intensive calculations on raw data and then to return event intelligence to the PRL.

Features and advantages of at least some embodiments of the invention configured as a PRL are set out in the following table.

| Unique Feature of the PRL | Benefits |
|---|---|
| Hybrid, multi-pixel radiation sensor array with separate output signal available from each pixel within the array. | Detection data from thousands of voxels (volume pixels) provides for sophisticated signal/pattern/statistical processing algorithms, leading to improved accuracy and reduced false alarm rate. |
| Multi-sensor array with knowledge of interaction location within the sensor | Detailed information about the geometry of interactions allows multiple algorithms to be applied and correlated in deriving the direction of the source. |
| Continuous event status - threat direction always shown regardless of display screen in use. | User always informed of location of threat and so can take actions in keeping with ALARA principle. |
| Key operating parameters of device are not accessible by the user; they are controlled by a "profile" loaded at time of issue. | Devices are in compliance with the operating policies and cannot be inadvertently or deliberately altered by the user. |
| Wireless network developed from existing network proven in first responder use. | Enables future integration of PRL with an existing CBRNE system. |
| Intelligent directed search guides user to next location for data collection. | Guides single or multiple PRLs to best locations to obtain event data quickly; implements ALARA principle for the users to minimize their exposure. Base station can offer path reversal guidance for "return to base" function. |
| Display offers different screens to keep amount of data manageable. | Device easier to use, less user training required, less risk of misinterpretation. |
| "Soft" keys - action of buttons is defined by firmware and only allows actions appropriate to current mode of use. | Device easier to use, less user training required, minimizes risk of errors due to incorrect user input. |
| Rugged hand held enclosure. | Device easier to use, first responder can focus on Search and Rescue (Discovery and Reaction) without worrying about having to protect the PRL. Device can be immersed for decontamination. |

In view of the foregoing description it will be evident to a person skilled in the art that various modifications may be made within the scope of the invention. For example, the pixellated array of contact pads or electrodes need not be square or rectangular, but may be formed in another arrangement such as concentric circles, spirals or a hexagon for example.

Additionally, charge circuitry 30 need not be driven in a raster pattern, but may be read-out in any suitable pattern an application of the invention or design parameters or constraints requires.

The ADCs need not be formed in the FPGAs of the system modules, but may be separately formed.

The location of individual devices need not be by GPS, but may be by wireless triangulation within a wireless mesh network, which is particularly useful if the devices are operating indoors.

The detector substrate need not be a crystal, but may be integrally formed on the ASIC, for example by vapour deposition of a compound of Aluminium (Al), Antimony (Sb), Indium (In), Lead (Pb), Mercury (Hg), Thallium (Ti) and Zinc (Zn) with a halide such as Iodide or Bromide.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

References

[1] "Performance Characteristics of Frisch-ring CdZnTe Detectors", Bolotnikov, A. E.; Camarda, G. C.; Carini, G. A.; Fiederle, M.; Li, L.; McGregor, D. S.; McNeil, W.; Wright, G. W.; James, R. B., Nuclear Science, IEEE Transactions Volume 53, Issue 2, April 2006 Page(s): 607-614

[2] H. H. Barrett, J. D. Eskin and H. B. Barber, Phys. Rev. Lett. 75 156 (1995)

[3] J. D. Eskin, H. H. Barrett and H. B. Barber, J. Appl. Phys. 85 647 (1999)

[4] W. W. Craig, F. E. Christensen, T. Decker, C. J. Hailey, F. A. Harrison, R. M. Hill, M. Jimenez-Garate, P. Mao, S. Schindler, SPIE Proc. 3445, pp. 112-120, *EUV, X-Ray, and Gamma-Ray Instrumentation for Astronomy IX,* 1998

[5] K. Suzuki, S. Seto, S. Dairaku, et all., J. Electron. Materi., 25 (1996) 1241-1246.

[6] J. E. Toney, B. A. Brunett, T. E. Schlesinger and R. B. James, IEEE Trans. On Nucl. Sc., Vol. 44, No. 4, 1684 (1997).

[7] E. B. Saff and A. B. J. Kuijlaars, "Distributing Many Points on a Sphere," *Math. Intelligencer,* vol. 19, pp. 5-11, 1997.

[8] J. Cui and W. Freedan, "Equidistribution on the sphere," *SIAM J. Sci. Comp.,* vol. 18, pp. 595-609, 1997.

[9] Feng Zhang, et al, "Improved Resolution for 3-D Position Sensitive CdZnTe Spectrometers", IEEE TRANSACTIONS ON NUCLEAR SCIENCE, VOL. 51, NO. 5, OCTOBER 2004 2427

The invention claimed is:

1. A high-energy radiation detector apparatus, comprising:
a high-energy radiation detector substrate comprising a first surface and a second opposing surface;
a plurality of charge collection electrodes disposed on the first and second opposing surfaces of the detector substrate, wherein the first surface comprises a pixelated distribution of charge collection electrodes disposed thereon forming an array and the second surface comprises a pixelated distribution of charge collection electrodes disposed thereon forming an array;

charge collection circuitry associated with the plurality of charge collection electrodes for collecting charge induced on the charge collection electrodes by a high energy radiation photon interaction event caused by high-energy radiation incident on the detector substrate: and signal processing circuitry configured to compare charge values representative of charge collected from corresponding charge collection electrodes of the respective first and second surfaces for determining a depth value for a photon interaction event in the detector substrate, wherein the signal processing circuitry is configured to determine the depth value for a photon interaction event in the detector substrate by establishing the ratio of the charge collected by an electrode for the first surface to the charge collected by an electrode for the second surface, and locating that ratio in a data set having charge ratio values paired with depth values to determine a corresponding depth value.

2. The apparatus according to claim 1, wherein the signal processing circuitry is configured to modify the charge values in dependence on the depth value for the photon interaction event.

3. The apparatus according to claim 1, wherein the signal processing circuitry is configured to determine a direction of incidence of the incident radiation relative to the detector substrate.

4. The apparatus according to claim 3, wherein the signal processing circuitry is configured to determine the direction of incidence based on an attenuation profile of the number of photon interaction events in the detector substrate relative to position of the photon interaction events in the detector substrate.

5. The apparatus according to claim 4, wherein the signal processing circuitry is configured to determine the direction of incidence based on an analysis of signals representative of charge corresponding to a photon interaction event in a detector substrate derived from a Compton scattering photon interaction event in the detector substrate and charge derived from the Compton scattering event.

6. The apparatus according to claim 3, wherein the signal processing circuitry is configured to determine the direction of incidence based on an analysis of signals representative of charge corresponding to a photon interaction event derived from a Compton scattering photon interaction event and charge derived from the Compton scattering photon interaction event.

7. The apparatus according to claim 6, wherein the signal processing circuitry is configured to determine the direction of incidence based on an analysis of signals representative of charge corresponding to a photon interaction event in a detector substrate derived from a Compton scattering photon interaction event in the detector substrate and charge derived from the Compton scattering event.

8. The apparatus according to claim 6, wherein the direction of incidence is based on analysis of charge associated with at least three Compton scattering photon interaction events.

9. The apparatus according to claim 3, further configured to provide a direction signal representative of the direction of incidence of the incident radiation.

10. A high-energy radiation location device, comprising:
an apparatus according to claim 9; and
a user interface configured to present to a user an indication of a direction of incidence of high-energy radiation relative to the device corresponding to the direction signal.

11. The device according to claim 10, further comprising a display mechanism and wherein the indication of a direction of incidence of high-energy radiation relative to the device corresponding to the direction signal comprises displaying a direction indicator on the display.

12. The device according to claim 10, configured as a portable device.

13. A high-energy radiation location system, comprising:
a central station operative to receive data signals over a communications network and comprising a display;
a plurality of apparatus according to claim 9, each operative to communicate a data signal representative of the direction of incidence over a communications network to a central station,
wherein the central station is configured with location and orientation information for each of the plurality of apparatus and further configured to estimate from location and orientation information and data signal corresponding to a respective apparatus a location of a source of the high-energy radiation.

14. The location system according to claim 13, wherein at least a one of the apparatus is operative to communicate wirelessly with the central station.

15. The location system according to claim 13, wherein the apparatus comprises a Global Positioning System (GPS) module and is operative to provide GPS derived location information and orientation information to the central station.

16. The apparatus according to claim 1, further comprising a Boron and/or Lithium coating over one or more surfaces of the detector substrate.

17. The apparatus according to claim 1, wherein the signal processing circuitry is configured to determine the energy of the incident radiation in dependence on the depth value for the photon interaction event and at least one signal representative of charge collected from a one of the charge collection electrodes.

18. A method of operating high-energy radiation detector apparatus, the apparatus comprising:
a high-energy radiation detector substrate comprising a first surface and a second opposing surface;
a plurality of charge collection electrodes disposed on the first and second opposing surfaces of the detector substrate, wherein the first surface comprises a pixelated distribution of charge collection electrodes disposed thereon forming an array and the second surface comprises a pixelated distribution of charge collection electrodes disposed thereon forming an array; and
charge collection circuitry associated with the plurality of charge collection electrodes for collecting charge induced on the charge collection electrodes by a high-energy radiation photon interaction event caused by high-energy radiation incident on the detector substrate, the method comprising:
comparing signals representative of charge collected from corresponding charge collection electrodes of the respective first and second surfaces for determining a depth of a photon interaction event in the detector substrate; and
determining the depth value for a photon interaction event in the detector substrate by establishing the ratio of the charge collected by an electrode for the first surface to the charge collected by an electrode for the second surface, and locating that ratio in a data set having charge ratio values paired with depth values to determine a corresponding depth value.

19. The method according to claim 18, further comprising determining the energy of the incident radiation in dependence on the depth of the photon interaction event and at least one signal representative of charge collected from a one of the charge collection electrodes.

20. The method according to claim 18, further comprising determining a direction of incidence of the incident radiation relative to the detector substrate.

21. The method according to claim 20, further comprising determining the direction of incidence based on an attenuation profile of the number of photon interaction events in the detector substrate relative to position of the photon interaction events in the detector substrate.

22. The method according to claim 21, further comprising determining the direction of incidence based on an analysis of signals representative of charge corresponding to a photon interaction event in a detector substrate of an additional high-energy radiation detector apparatus and derived from a Compton scattering photon interaction event in a detector substrate of the additional high-energy radiation detector apparatus and charge derived from the Compton scattering photon interaction event.

23. The method according to claim 20, further comprising determining the direction of incidence based on an analysis of signals representative of charge corresponding to a photon interaction event derived from a Compton scattering photon interaction event and charge derived from the Compton scattering photon interaction event.

24. The method according to claim 23 or 22, wherein determining the direction of incidence is based on charge derived from at least three Compton scattering events.

25. The method according to claim 20, further comprising providing a direction signal representative of the direction of incidence of the incident radiation.

26. The method according to claim 18, further comprising modifying the charge values in dependence on the depth value for the photon interaction event.

* * * * *

UNITED STATES PATENT AND TRADEMARK OFFICE
CERTIFICATE OF CORRECTION

PATENT NO. : 8,759,784 B2
APPLICATION NO. : 12/304754
DATED : June 24, 2014
INVENTOR(S) : David Prendergast et al.

Page 1 of 1

It is certified that error appears in the above-identified patent and that said Letters Patent is hereby corrected as shown below:

On the Title Page, Item (54) and in the Specification, column 1, line 2, Title, Change "HIGH-ENGERY" to --HIGH-ENERGY--.

In the Specification

In column 1 at line 9, Change "06111620.0," to --0611620.0,--.

In column 2 at line 32, Change "know" to --known--.

In column 5 at line 64, Change "fourh" to --fourth--.

In column 8 at line 54, Change "capacitative" to --capacitive--.

In column 13 at line 11 (approx.), Change " $I_0-I=I_0I_0e^{-\mu CZT(E_n)x}=I_0(1-e^{-\mu CZT(E_n)x})$ " to $$I_0-I = I_0 - I_0 e^{-\mu_{CZT}(E_n)x} = I_0(1 - e^{-\mu_{CZT}(E_n)x})$$ --.

In column 14 at line 2, Change ",i.e" to --, i.e.,--.

In the Claims

In column 23 at line 10, In Claim 1, change "substrate:" to --substrate;--.

Signed and Sealed this
Seventeenth Day of February, 2015

Michelle K. Lee
*Deputy Director of the United States Patent and Trademark Office*